(12) United States Patent
Ashford et al.

(10) Patent No.: US 7,965,396 B2
(45) Date of Patent: Jun. 21, 2011

(54) ENHANCED LASER PROJECTOR CALIBRATION WALL

(75) Inventors: Curtis M. Ashford, St. Peters, MO (US); Richard L. Blankenship, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 446 days.

(21) Appl. No.: 12/048,982

(22) Filed: Mar. 14, 2008

(65) Prior Publication Data

US 2009/0229339 A1  Sep. 17, 2009

(51) Int. Cl.
*G01B 11/14* (2006.01)
(52) U.S. Cl. ............................................ 356/620
(58) Field of Classification Search .......... 356/6, 23–24, 356/72–73, 121–122, 152.1–152.3, 614, 356/620
See application file for complete search history.

(56) References Cited

U.S. PATENT DOCUMENTS 6,392,222 B1 * 5/2002 Greenwood ............... 250/221
2004/0200947 A1 * 10/2004 Lau .......................... 250/202

OTHER PUBLICATIONS

"About LPT", Laser Projection Technologies, Inc., Available as early as Oct. 8, 2007 at <<http://web.archive.org/web/20071008193628/www.lptcorp.com/Laser+Projection+About++LPT.htm>>, 1 page.
"Laser Projectors", Laser Projection Technologies, Inc., Available as early as Aug. 24, 2007 at <<http://web.archive.org/web/20070824010702/www.lptcorp.com/Laser+Projection+Laser+Projectors.htm>>, 1 page.

* cited by examiner

*Primary Examiner* — Tarifur Chowdhury
*Assistant Examiner* — Tara S Pajoohi
(74) *Attorney, Agent, or Firm* — Caven & Aghevli LLC

(57) ABSTRACT

Apparatus and methods for calibrating a laser projection system that is used for marking and guidance of components during manufacturing are disclosed. The apparatus includes a structural frame. One or more positioning stages are coupled to the structural frame. Each of the positioning stages is provided with a movable reflective target that is configured to reflect a corresponding laser beam.

21 Claims, 7 Drawing Sheets

ENHANCED LASER PROJECTOR CALIBRATION WALL

TECHNICAL FIELD

The present disclosure relates to systems and methods for laser projector calibration, and more specifically, to systems and methods for using a reflective calibration wall to calibrate laser projectors.

BACKGROUND

Laser projection systems are used to record visible images directly onto components during an assembly process. In some applications, laser projection systems are used to provide guidance during manufacturing and assembly of components, such as carbon fiber reinforced plastic (CFRP) components. In other applications, laser projection systems are used to create markings and images on production parts. The laser marking of parts may facilitate the subsequent processing and assembly of the parts into a cohesive superstructure. Typically, a laser projection system includes a plurality of projectors capable of generating laser beams. Accordingly, the use of laser projection systems for guidance and marking applications generally demands that the orientations of the projected laser beams to be properly calibrated with respect to one another. Current calibration mechanisms typically rely on visual estimation of the offsets between the orientations of the various lasers of a laser projection system to create a best fit value for calibration. The use of visual estimation by a human operator to calibrate a laser projection system that is critical to manufacturing may be a time consuming trial and error process that reduces overall component production and assembly efficiency.

SUMMARY

Systems and methods for calibrating a laser projection system that is used for guidance and marking during manufacturing are disclosed. These novel systems and methods provide an enhanced laser projection system calibration wall that enables a quantitative analysis of the projected position accuracy of laser beams. Accordingly, embodiments of systems and methods in accordance with the present disclosure may advantageously provide a mechanism to quickly and quantitatively correct the alignment of any out of tolerance laser projectors in laser projection systems.

In various embodiments, an apparatus for calibrating a laser projection system includes a structural frame. One or more positioning stages are coupled to the structural frame. Each of the positioning stages is provided with a movable reflective target that is configured to reflect a corresponding laser beam. In other embodiments, a method for assembling a laser projector calibration mechanism includes coupling at least one positioning stage to a structural frame. The method further includes disposing a reflective target on each positioning stage, as well as placing one or more reflective targets on the structural frame. Each reflective target is configured to reflect a corresponding laser beam.

In other embodiments, a method for calibrating a laser projection system includes projecting a plurality of laser beams from the laser projection system to a corresponding number of reflective targets, the reflective targets including both movable and non-movable reflective targets. The proximity of each reflective target to the other reflective targets represents a laser projector calibration system that is in tolerance. The method further includes centering a first group of one or more laser beams onto corresponding non-movable reflective targets. The method also includes moving the one or more movable reflective targets so that each laser beam from a second group is centered on a corresponding movable reflective target. The deviation, that is, measured movement of each movable reflective target is obtained. The one or more deviations are compared to corresponding tolerances to determine the usability of the laser projection system.

The features, functions, and advantages that have been discussed above or will be discussed below can be achieved independently in various embodiments, or may be combined in yet other embodiments, further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

Embodiments of systems and methods in accordance with the present disclosure are directed to a calibration wall that is used to calibrate laser projection systems. In turn, the laser projection systems are used in the manufacturing and assembly of aircraft components. The calibration wall enables the quantitative analysis of the positioning accuracy of the various projected laser beams included in the laser projection systems. Accordingly, this quantitative analysis method may improve efficiency in determining the proper calibration of laser projection systems. Many specific details of certain embodiments are set fourth in the following description and in FIGS. 1-6 to provide a thorough understanding of such embodiments. The present disclosure may have additional embodiments, or may be practiced without one or more of the details described below.

Figure 1:
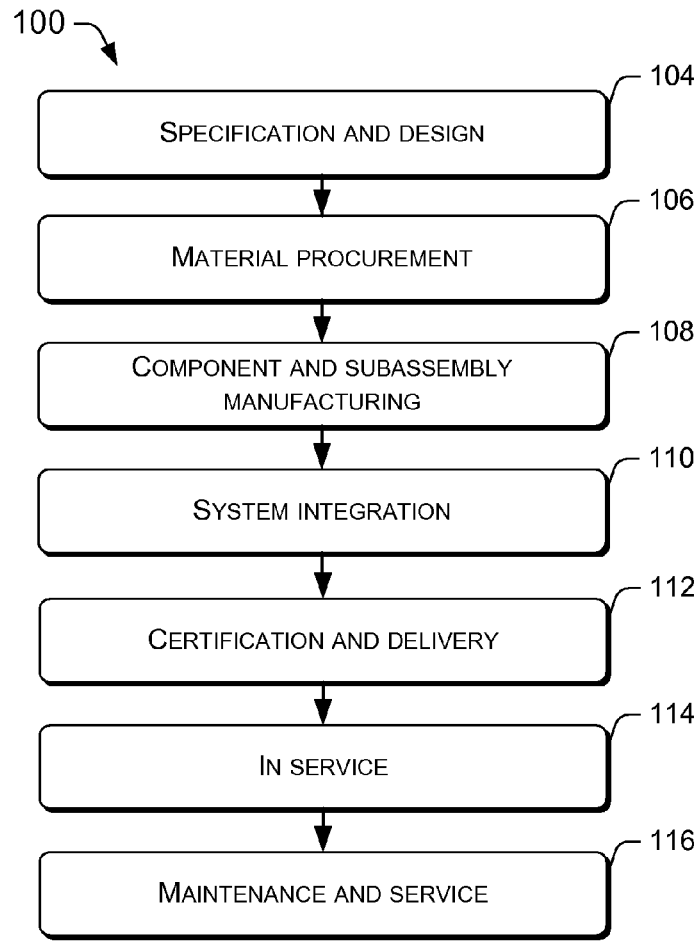
FIG. 1 is a flow diagram of an aircraft manufacturing and service method.
Figure 2:
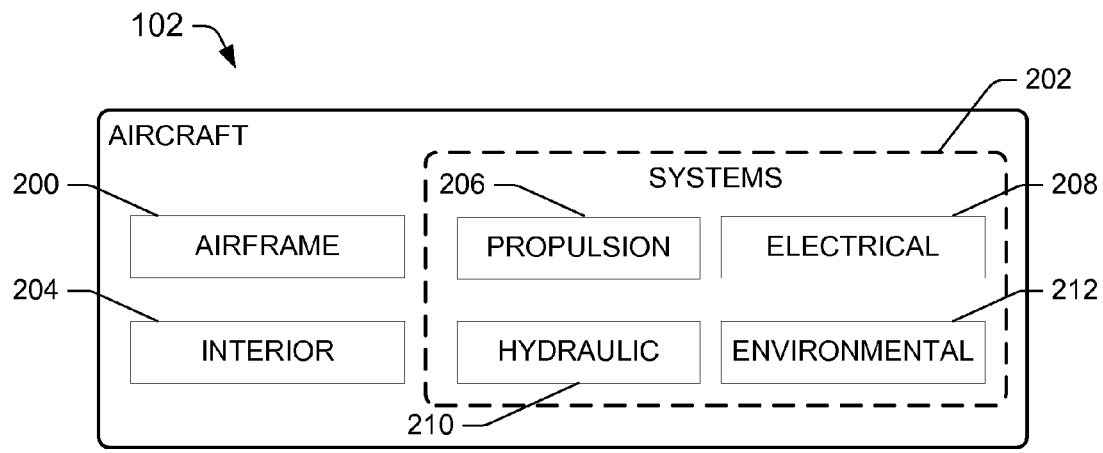
FIG. 2 is a block diagram of an aircraft produced according to the manufacturing and service method described in FIG. 1.

Referring more particularly to the drawings, embodiments of this disclosure may be described in the context of an aircraft manufacturing and service method 100 as shown in FIG. 1, and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 200 with a plurality of systems 202 and an interior 204. Examples of high-level systems include one or more of a propulsion system 206, an electrical system 208, a hydraulic system 210, and an environmental system 212. Any number of other systems may be included. Although an aerospace example is shown, the principles of this disclosure may be applied to other industries, such as the automotive industry.

Apparatuses and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 3A:
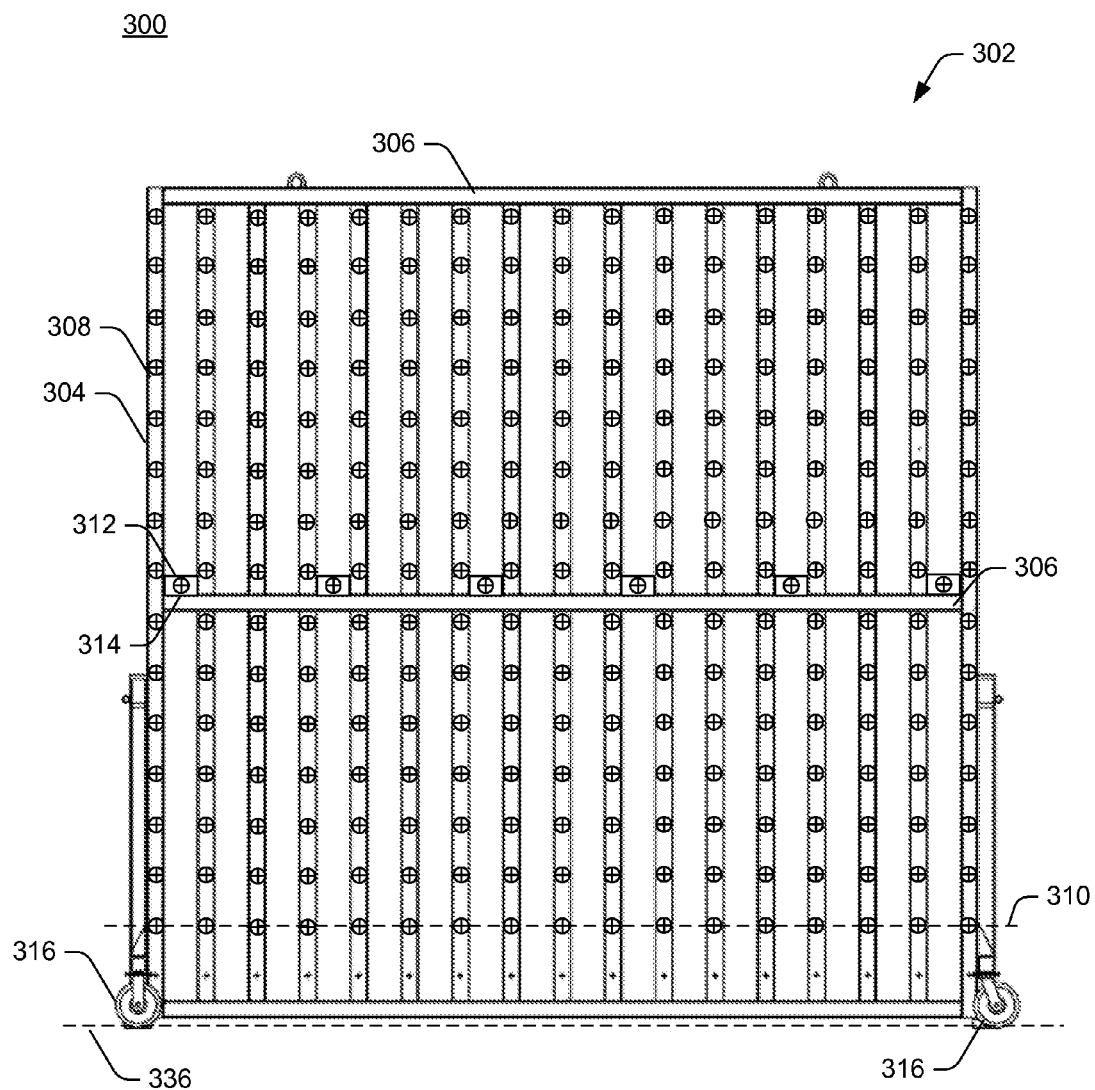
FIG. 3A is a front view of an exemplary laser projection system calibration wall, in accordance with various embodiments of an enhanced laser projection calibration wall.

FIG. 3A illustrates a front view of an exemplary laser projection system calibration wall 300, in accordance with various embodiments. The exemplary calibration wall 300 includes a structural frame 302. The structural frame 302 may be constructed from one or more upright structural members 304 and one or more lateral structural members 306 that intersect to form a cross-member frame. The structural members 304 and 306 may be linear, or substantially linear, members. The structural members 304 and 306 may be manufactured from various metallic, composite, natural, or hybrid materials, such as, but not limited to, wood, steel, aluminum, polymer, fiberglass, carbon-fiber reinforced plastic (CFRP), and the like. In some embodiments, the various structural members 304 and 306 may be coated with a surface treatment that enhances the durability and longevity of the members. For example, metallic members may be covered with an enamel finish.

In embodiments where the structural frame 302 is formed from multiple upright structural members 304 and multiple lateral structural members 306, at least some of the upright structural members 304 and at least some of the lateral structural members 306 may be disposed perpendicular, or substantially perpendicular, to each other. For example, the structural members 304 and 306 may be configured to form a rectangular frame that is approximately 4' by 6' in one embodiment. However, alternative embodiments are in no way restricted to such dimensions. In other embodiments, the structural frame 302 may be constructed from a plurality of structural members that intersect each other at angles other than perpendicular or substantially perpendicular. Moreover, the plurality of structural members may further include linear, substantially linear, and/or non-linear structural members.

The exemplary calibration wall 300 includes a plurality of fixed reflective targets 308. The fixed reflective targets 308 may be mounted directly on the various structural members of the structural frame 302, such as the structural members 304 and 306. In other instances, the fixed reflective targets 308 may be mounted to intermediary components (not shown) that are mounted on the various structural members, such as the structural members 304 and 306. For example, the intermediary components may include "L" brackets, wherein one side of each bracket is mounted to a structural member, such as one of the various structural members 304 and 306, and the other side mounted to a fixed reflective target 308. The "L" brackets may be configured so that at least some of the sides of the brackets are of identical length, or substantially identical length, to the corresponding sides of other brackets. In other instances, at least some of the sides of the brackets may be of different length from the corresponding sides of other brackets. Each of the fixed reflective targets 308 may include a reflective surface that is configured to reflect laser radiation. In some embodiments, the fixed reflective targets 308 may include a circular region that is configured with markings that delineate the absolute center, as well as markings that designate proximity to the absolute center from various portions of the circular region. For example, the fixed reflective target 308 may include the assortment of Retro-Reflective laser targets manufactured by Hubbs Machine & Manufacturing Inc. of Cedar Hill, Mo. However, laser reflective targets of other type and manufacturer may be implemented in alternative embodiments.

According to various embodiments, the fixed reflective targets 308 may be mounted on the structural frame 302 in such a way that every reflective surface of the fixed reflective targets 308 lie in the same plane, or as nearly in the same plane as possible. Moreover, the reflective surfaces are also oriented toward an identical planar surface. In other words, they are facing the same direction, or substantially the same direction. The fixed reflective targets 308 may be further mounted so that the absolute center of one fixed reflective target 308 is aligned along, or approximately along, at least one axis with the absolute centers of a plurality of other fixed reflective targets 308. In this way, the fixed reflective targets 308 may be formed into linear patterns. Such an alignment is illustrated by line 310. In one embodiment, a linear pattern may include perpendicular lines of fixed reflective targets 308. Such mounting techniques may serve to facilitate the proper calibration of a laser projection system.

The exemplary calibration wall 300 further includes one or more positioning stages 312. The one or more positioning stages 312 are coupled to the various structural members 304 and 306 of the structural frame 302. In some embodiments, the one or more positioning stages 312 may include two-axes positioning stages. Each of the two-axes positioning stages may include a first portion that moves laterally relative to a base along a first axis, and a second portion that moves laterally relative to the first portion along a second axis. In these embodiments, the second axis may be perpendicular to the first axis. An exemplary two-axis positioning stage suitable for use as positioning stages 312 include the 460A-XY model Low-Profile Integrated Ball Bearing Linear Stages manufactured by the Newport Corporation of Irvine, Calif. However, two-axis positioning stages of other type and manufacturer may be implemented in alternative embodiments.

In other embodiments, the one or more positioning stages 312 may include three-axes positioning stages. each of the three-axis positioning stages includes a first portion that moves laterally relative to a base along a first axis, and a second portion that moves laterally relative to the first portion along a second axis, and a third portion that moves laterally relative to the second portion along a third axis. In these embodiments, the second axis may be perpendicular to the first axis, and the third axis may be perpendicular to both the first axis and the second axis. An exemplary three-axis positioning stage suitable for use as positioning stages 312 include the 460A-XYZ model Low-Profile Integrated Ball Bearing Linear Stages manufactured by the Newport Corporation of Irvine, Calif. However, three-axis positioning stages of other type and manufacturer may be implemented in alternative embodiments.

In accordance with various implementations, the one or more positioning stage 312 are coupled to the structural members 304 and 306 via the base, thereby enabling the various lateral movement portions of each positioning stage 312 to move unhindered. In other implementations, an intermediary component (not shown), may serve to couple the base of the positioning stage 312 to the structural frame 302.

Moreover, each lateral movement portion of the positioning stage 312 may be equipped with a micrometer that is configured to measure the lateral displacement of the portion with respect to a pre-designated starting point. In one example, the micrometer may include a micrometer from the SM Series Vernier micrometers manufactured by the Newport Corporation of Irvine, Calif. However, micrometers of other type and manufacturer may be implemented in alternative embodiments.

While each lateral movement portion of the positioning stage 312 may be moved manually, each portion may also be configured to be moved laterally by powered actuators. It will be appreciated that the powered actuators may include, but are not limited to, electromechanical actuators, hydraulic actuators, pneumatic actuators, and the like.

As further shown in FIG. 3A, each of the positioning stages 312 may be provided with a movable reflective target 314. As used herein, "movable" denotes the fact that the reflective targets 314 are capable of movement relative to the structural frame 302 because they are mounted on the positioning stages 312. The movable reflective targets 314 may be of the same type as the fixed reflective targets 308.

The combination of positioning stages 312 and movable reflective targets 314 may be mounted on the structural frame 302 in such a way that when all the micrometers of the positioning stages are at pre-designated original positions, every reflective surface of the movable reflective targets 314 lie in the same plane, or as nearly in the same plane. In addition, the reflective surfaces of the movable reflective target 314 may also lie in the same, or nearly the same plane, as the reflective surfaces of the fixed reflective targets 308. Further, all the reflective surfaces are also oriented toward an identical planar surface as a result of the mounting technique described above. In some embodiments where the positioning stages 312 are two-axes stages, each positioning stage 312 may be mounted so that the movable reflective targets 314 may be moved along a X-axis of the plane, "left-to-right", and along a Y-axis of the plane, "up-and-down". Similarly, in other embodiments where the positioning stages 312 are three-axes stages, each positioning stage 312 may be mounted so that the movable reflective targets 314 may be moved along a X-axis of the plane, along a Y-axis of the plane, and along a Z-axis that is perpendicular to the plane, i.e., "in-and-out" the plane.

The calibration wall 300 may also be equipped with one or more wheels 316 that are coupled to the structural frame 302. In one embodiment, the calibration wall 300 may be equipped with four wheels 316. The one or more wheels 316 may include at least one caster wheel. A caster wheel generally includes an offset steering pivot so that the wheel will automatically swivel to align itself to the direction from which it is pushed. In another embodiment, at least one of the one or more wheels 316 may be provided with a locking component (e.g., an integrated wheel choke) that prevents the rotation of the wheel when engaged. The placement of the one or more wheels 316 with respect to the structural frame 302 is further described in FIG. 3B.

Figure 3B:
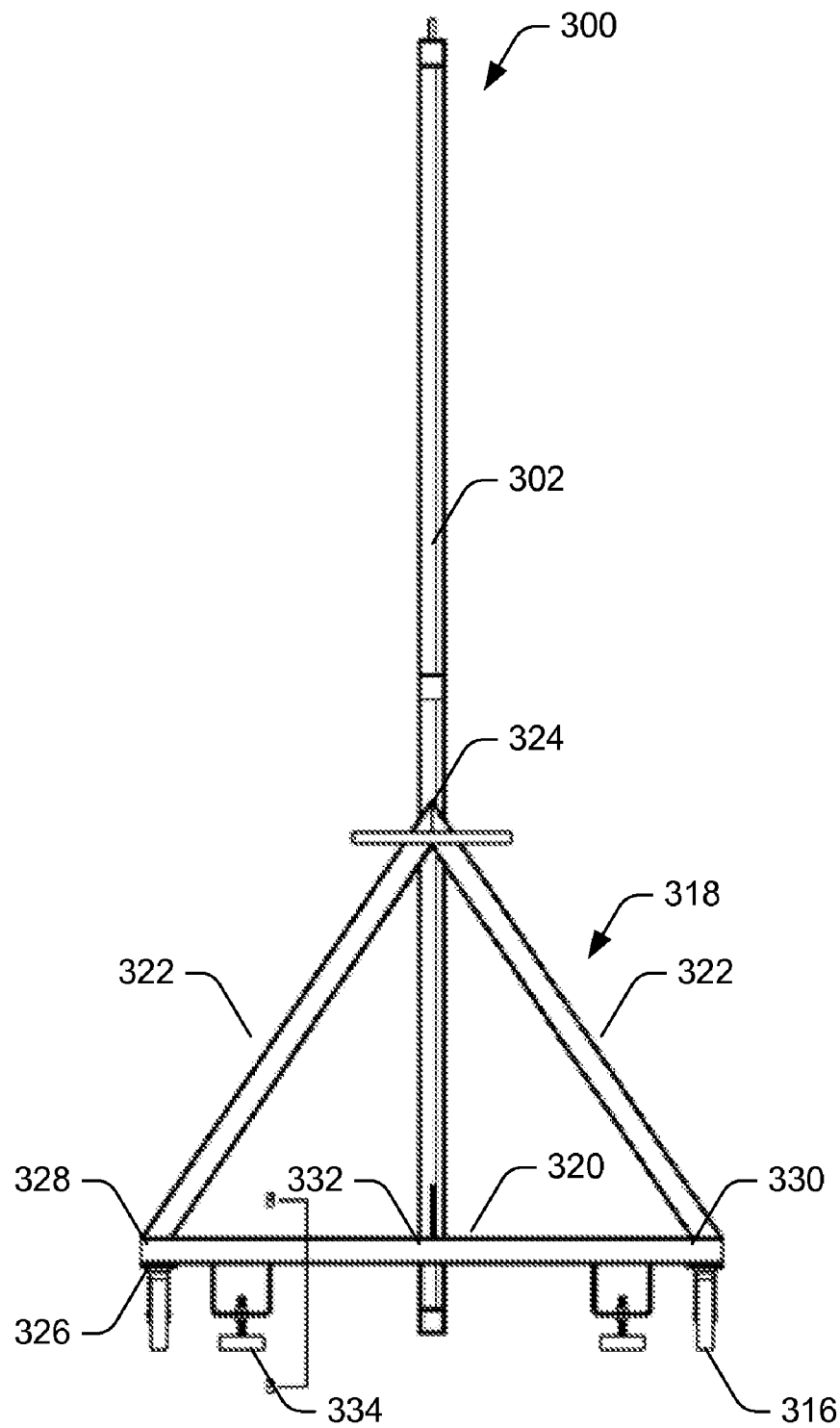
FIG. 3B is a side view of the exemplary laser projection system calibration wall illustrated in FIG. 3A, in accordance with various embodiments of an enhanced laser projection calibration wall.

FIG. 3B is a side view of the exemplary laser projection system calibration wall 300 illustrated in FIG. 3A, in accordance with various embodiments. As shown, the one more wheels 316 may be attached to the structural frame via at least one structural support 318. In one embodiment, the calibration wall 300 may be equipped with a pair of structural supports 318. The combination of the one or more wheels 316 and the at least one structural support 318 may be configured to hold the structural frame 302 in an upright position so that the reflective surfaces of the fixed and movable reflective targets 308 and 314 are perpendicular, or substantially perpendicular, to a horizontal surface. In this way, the one or more wheels 316 may facilitate the movement of the calibration wall 300 between locations while the calibration wall 300 is in an upright position.

In one embodiment, the at least one structural support 318 may include a base member 320 and two bracing members 322. The base member 320 is configured to provide an attachment point 324 for the structural frame 302, as well as attachment points 326 for the one or more wheels 316. The two bracing members 322 may be attached to the base member 320 at attachment points 328 and 330, respectively. Additionally, the bracing members 322 may be further coupled to the structural frame 302 at attachment point 332 to hold the structural frame 302 in an upright position. However, it will be appreciated that in other embodiments, a variety of other structural support may be implemented to couple the one or more wheels 316 to the structural frame 302 as well as hold the structural frame in an upright position. Accordingly, the structural support 318 is an example rather than a limitation. Moreover, while the calibration wall 300 may be equipped with a plurality of wheels 316 (e.g., four wheels) in a particular embodiment, one or more of these wheels 316 may be substituted with legs that do not include an element that rotates on a surface. For example, in one embodiment, the calibration wall 300 includes a plurality of wheels 316 on one side, and a plurality of legs on the other side. Accordingly, the calibration wall 300 may be moved between locations by manipulating the calibration wall 300 so that its weight rests entirely on the plurality of wheels 316 rather the legs.

The calibration wall 300 may further include at least one jack stand 334. The at least one jack stand 334 may be coupled to the calibration wall 300. According to some embodiments, the at least one jack stand 334 may be coupled to a support structure, such as the support structure 318, that is coupled to the structural frame 302. In other embodiments, the at least one jack stand 334 may be coupled directly to the structural frame 302. The at least one jack stand 334 may be adjusted to offset the calibration wall 300 against a surface underneath the wall such that at least two fixed reflective targets are approximately aligned on a line, such as line 310 (FIG. 3A), that is parallel to a level horizontal surface 336 (FIG. 3A). Also, the at least one jack stand 334 may be further adjusted to compensate for any pitch or unevenness in the surface 336 in order to maintain the structural frame 302 in an upright position so that the reflective surfaces of the fixed and movable reflective targets 308 and 314 are perpendicular, or substantially perpendicular, to a horizontal plane. Accordingly to various embodiments, the at least one jack stand 334 may include a variety of actuators that are configured to vertically displace the structural frame 302 of the calibration wall 300, such as mechanical actuators, electromechanical actuators, hydraulic actuators, pneumatic actuators, and the like. The placement of the jack stands with respect to the structural frame 302 is further illustrated in FIG. 3C.

Figure 3C:
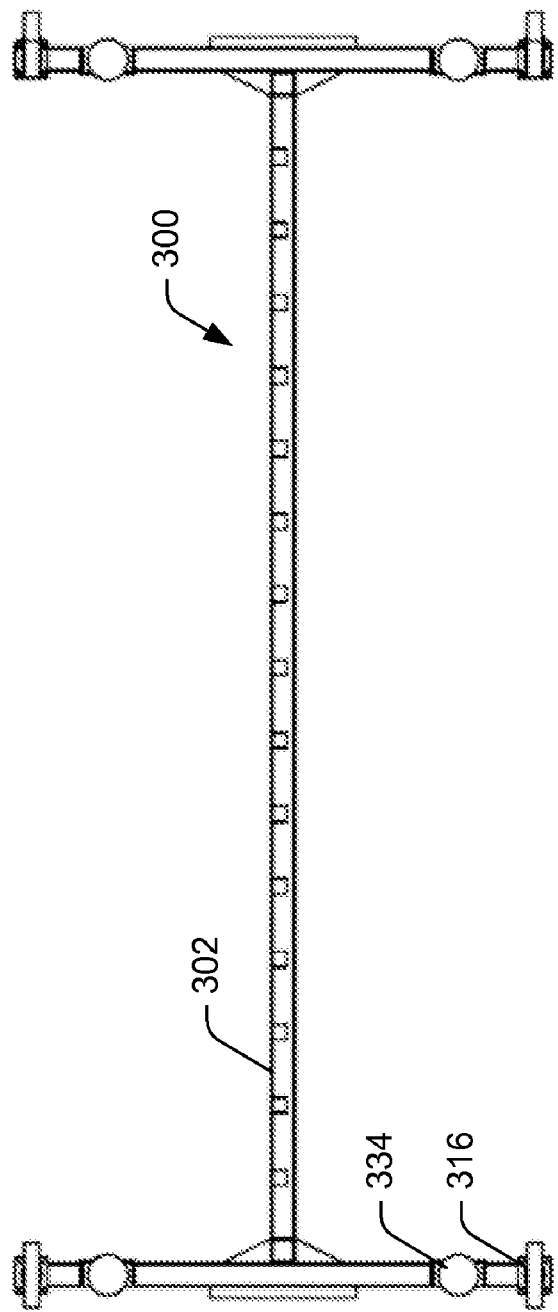
FIG. 3C is a bottom view of an exemplary laser projection system calibration wall illustrated in FIG. 3A, in accordance with various embodiments of an enhanced laser projection calibration wall.

FIG. 3C is a bottom view of an exemplary laser projection system calibration wall illustrated in FIG. 3A, in accordance with various embodiments. As shown in FIG. 3C. The at least one jack stand 334 may be positioned proximate the one or more wheels 316. For instance, the at least one jack stand 334 may be mounted to the same base members 320 of the structural support 318. In an embodiment where a calibration wall 300 includes a pair of structural supports 318, wherein each structural support 318 is attached to a pair of wheels 316, two jack stands 334 may also be attached to each structural support 318. In such an embodiment, each of the jack stands 334 is configured to take over a load from a wheel 316 when the jack stand 334 is at least partially extended. Accordingly, the jack stands 334 may function to adjust the vertical orientation of the structural frame 302, as well as prevent movement of the calibration wall 302 due to slippage or rotation of the wheels 316.

Finally, it will be appreciated that the various components 302-308 and 312-334 of the calibration wall 300 may be coupled together by a multitude of techniques, including, but not limited to, magnetic mounts, frictional mounts, mechanical fasteners, adhesives, welding, soldering, carbon fiber layups and molding, etc.

Figure 4:
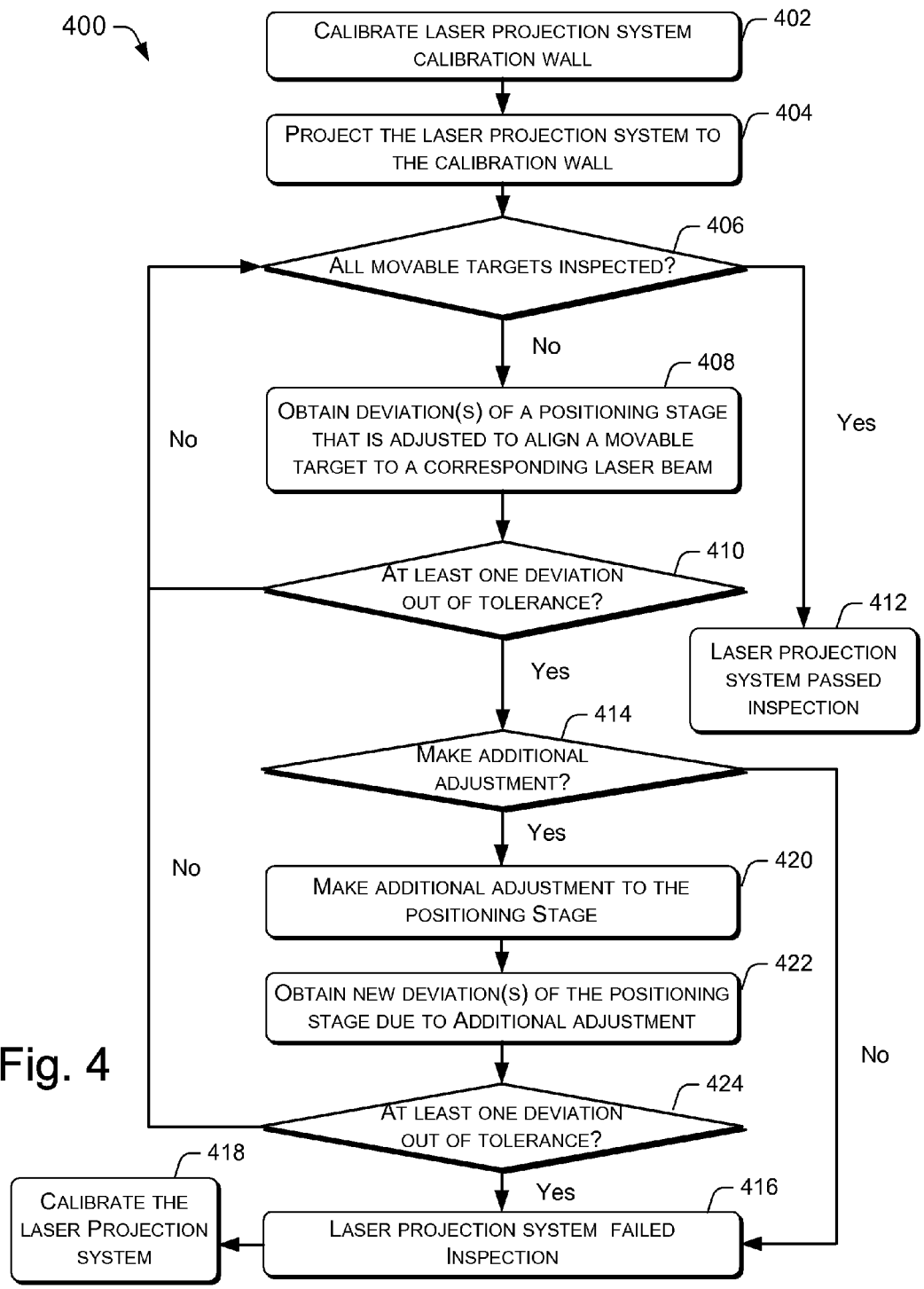
FIG. 4 is a flow diagram illustrating an exemplary process for calibrating a laser projection system using the exemplary calibration wall shown in FIGS. 3A-C, in accordance with various embodiments of an enhanced laser projection calibration wall.
Figure 5:
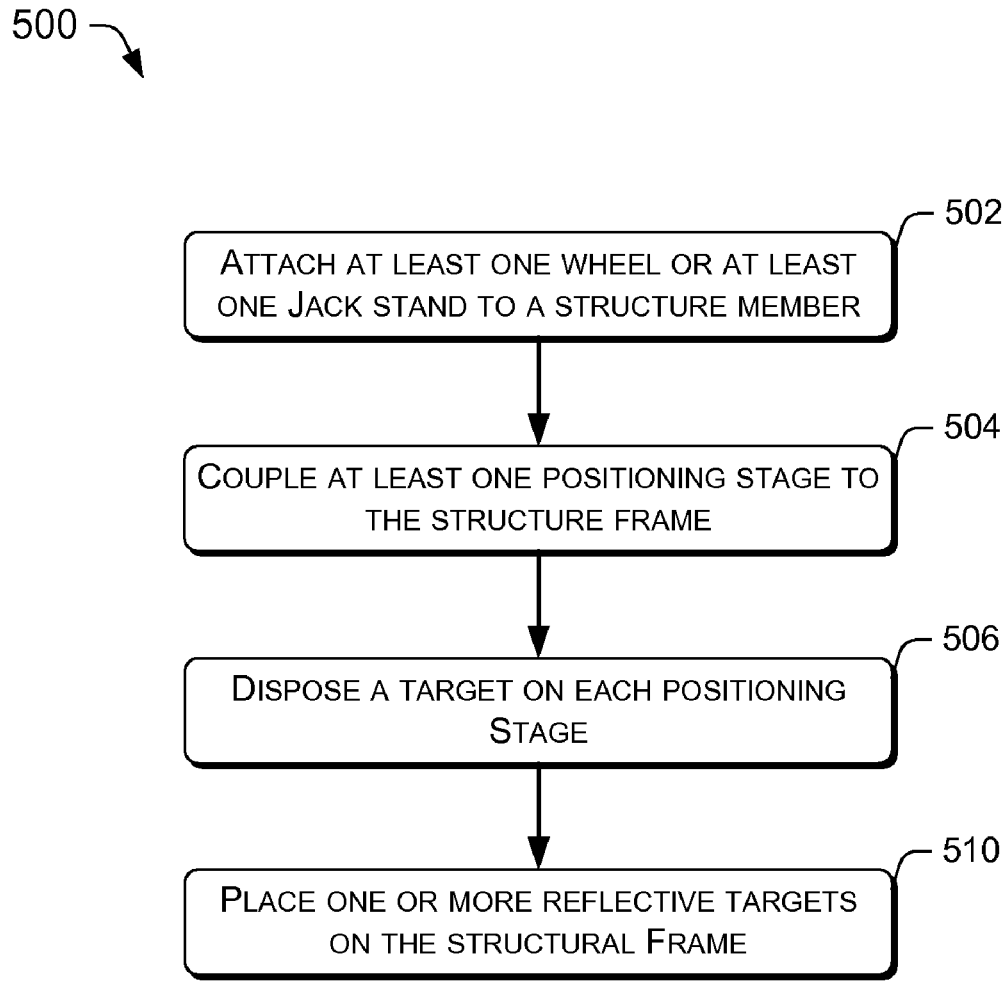
FIG. 5 is a flow diagram illustrating an exemplary process for assembling a laser projection system calibration wall shown in FIGS. 3A-C, in accordance with various embodiments of an enhanced laser projection calibration wall.

FIGS. 4-5 illustrate exemplary processes. The order in which the operations are described in each process is not intended to be construed as a limitation, and any number of the described blocks can be combined in any order and/or in parallel to implement the process.

FIG. 4 illustrates an exemplary process 400 for calibrating a laser projection system using the exemplary calibration wall 300. At block 402, the calibration wall 300 is calibrated. In one embodiment, each micrometer, as provided to each lateral movement portion of the positioning stages, is positioned in a pre-designated mid-range, i.e., starting point. The positioning stages may include the positioning stages 312. Each micrometer is configured to measure the displacement of the corresponding lateral movement portion from this starting position. The location of each reflective target of the calibration wall 300 may then be determined. The reflective targets may include the fixed reflective targets 308 placed on a structural frame 302, as well as the movable reflective targets 314 disposed on the positioning stages. In one embodiment, the locations of the reflective targets may be recorded using a photogrammetry system. Photogrammetry is the determination of three-dimensional coordinates of points on an object by measurements made in two or more photographic images taken from different positions. In one embodiment, the photogrammetry system may be a V-STARS system manufactured by Geodetic Systems, Inc. of Melbourne, Fla.

Following the determination of the locations of the reflective targets, the location data may be further processed to create a data file that is compatible with a laser projection system to be calibrated. The data file may be configured to enable the laser projection system to project laser beams to the locations specified in the data file.

At block 404, the laser projection system may be operated to project laser beams based on the data file that contains the locations of the reflective targets. Further, the laser projection system may be positioned proximate the calibration wall so that laser beams that correspond to certain "key" reflective targets are aligned on the center of these targets. According to various embodiments, at least some of the fixed targets 308 may function as the "key" reflective targets. In one embodiment, the "key" reflective targets may include at least six fixed reflective targets 308. Subsequently, the projected laser beams may be configured to project circle images.

At decision block 406, a determination may be made as to whether the movable targets align to their corresponding projected laser beam, e.g., circle images. If it is determined that not all the movable targets are inspected, ("No" at decision block 406), the process 400 may proceed to block 408. At block 408, the position of a projected laser beam, e.g., circle image, is compared to the position of the corresponding reflective target to obtain one or more deviations. In one embodiment, the one or more deviations, if any, for a specific positioning stage are obtained by laterally moving the respective lateral movement portions of the positioning stage along a "X-axis", that is, "left-and-right," and/or along a "Y-axis", that is, "up-and-down", as described above with respect to FIG. 3A. The specific positioning stage is moved in this fashion until the projected laser beam is centered on the absolute center of the corresponding reflective target. Once the projected laser beam is centered, any deviation of each portion of the positioning stage, as indicated by a corresponding micrometer reading of a displacement from the pre-designated starting point, may be observed. This observed deviation represents the projection error for the particular laser beam.

At decision block 410, a determination is made as to whether at least one of the deviations for the laser beam is out of tolerance, that is, exceeds a corresponding predetermined tolerance threshold. If no deviation is out of tolerance, ("No" at decision block 410), the process 400 may loop back to decision block 406. In other words, the process 400 may be repeated again to inspect other movable reflective targets for deviations until all projected laser beams are tested. As shown, if none of the movable reflective targets indicates that corresponding projected laser beams are out of tolerance, the laser projection system is deemed to have passed inspection at block 412 and ready for use.

Returning to decision block 410, if at least one deviation is out of tolerance, ("Yes" at decision block 408), the process 400 may continue to decision block 414. At decision block 414, a determination may be made as to whether additional adjustments should be made to the specific positioning stage. In one example, additional adjustments to the specific positioning stage may be made if the positioning stage is a three-axes stage. However, no additional adjustment stage is made for a two-axes stage. Thus, if it is determined that no additional adjustments should be made, ("No" at decision block 410), the process 400 proceeds to block 416, where it is determined that the laser projection system failed the inspection and should not be used. Accordingly, at block 418, the laser projection system may be calibrated. In one instance, the calibration process may include adjusting each laser projector responsible for projecting the out of tolerance laser beam to bring it into tolerance.

Returning to decision block 414, if it is determined that additional adjustments should be made, ("Yes" at decision block 414), the process 400 may continue to block 420. At decision block 420, a three-axes positioning stage may be further adjusted to align the absolute center of the corresponding reflective target with the projector laser beam. In one embodiment, the initial adjustments include moving the "X-axis" and/or "Y-axis" deviations into tolerance. In other words, the relevant lateral movement portions of the positioning stage are moved toward their original position so that the respective micrometers indicate that they are at, or approximately at the tolerance thresholds. Subsequently, a lateral movement portion of the positioning stage that is responsible for the "Z-axis" movement is adjusted, that is, moved towards or away from the laser projection system, until the projected laser beam is centered on the reflective target. In some embodiments, additional minor adjustments along the "X-axis" and the "Y-axis" may be provided to further center the laser beam on the absolute center of the reflective target.

At block 422, one or more new deviations are obtained after the additional adjustments. In other words, the displacement of each lateral movement portion of a positioning stage in the X-axis, Y-axis, and Z-axis, if any, are observed in the same fashion as describe in block 408. At decision block 424, a determination is made as to whether at least one of the deviations for the laser beam is out of tolerance, that is, exceeds a corresponding predetermined tolerance threshold. If no deviation is out of tolerance, ("No" at decision block 422), the process 400 may loop back to decision block 406. However, if at least one deviation is out of tolerance, ("Yes" at decision block 424), the process 400 may continue to decision block 416, where it is determined that the laser projection system failed the inspection and should not be used It will be appreciated that in some embodiments, the exemplary calibration process 400 may be carried at various distances to ensure that a tested laser projection system is accurate for various application and range scenarios. For example, in one embodiment, exemplary process 400 may be implemented when a laser projection is at a first distance from the exemplary calibration wall 300, then once again at a second distance that is greater than the first distance, followed by another implementation at a third distance that is greater than the second distance.

FIG. 5 illustrates an exemplary process 500 for assembling an embodiment of the laser projection system calibration wall 300. At block 502, at least one wheel and/or at least one jack stand is attached to a structural frame of the calibration wall 300. The structural frame may be the structural frame 302, and the at least one wheel may include a wheel 316, and the at least one jack stand may include a jack stand 334. As described above, the at least one wheel and the at least one jack stand may be mounted directly to the structural frame, or to a support structure, such as support structure 318, that is attached to structural frame.

At block 504, at least one positioning stage may be mounted to the structural frame of the calibration wall 300. The at least one positioning stage may include a positioning stage 312. Further, the at least one positioning stage may be equipped with micrometers that are configured to measure the displacements of its lateral movement portions. At block 506, a reflective target, such as the movable reflective target 314, may be disposed on teach the positioning stages. At block 508, additional reflective targets, such as the fixed reflective targets 308, may be placed on the structural frame of the calibration wall 300. The reflective targets may be aligned in positions and patterns (e.g., along various axes), to facilitate the calibration of a laser projection system.

Figure 6:
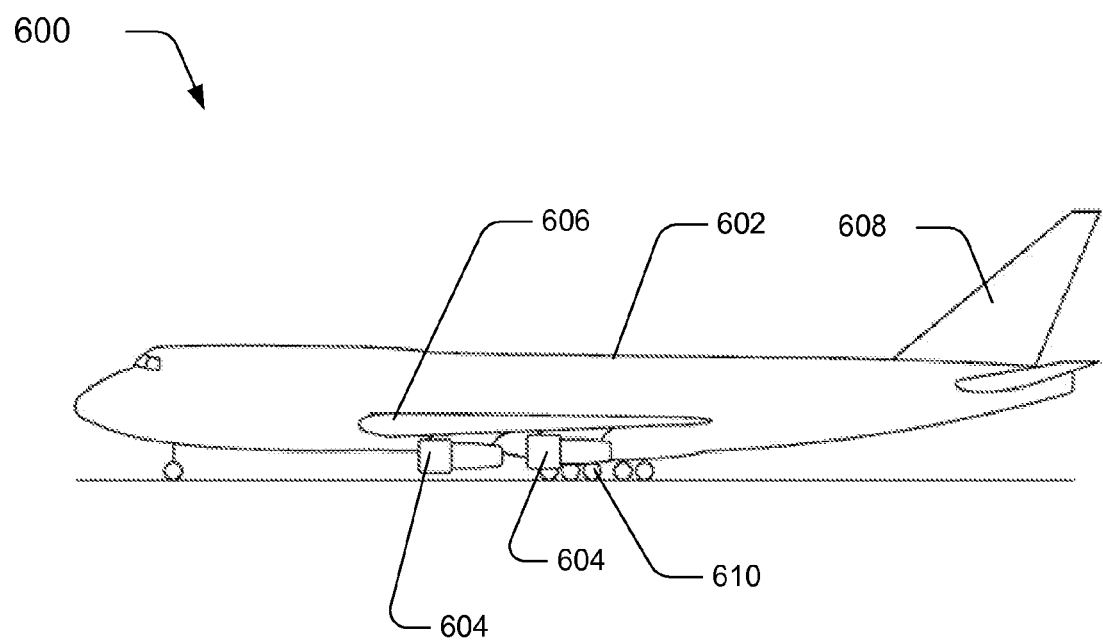
FIG. 6 is a side elevational view of an aircraft that includes components that are assembled or manufactured using laser projection systems calibrated by the exemplary calibration wall, in accordance with various embodiments of an enhanced laser projection calibration wall.

FIG. 6 is a side elevational view of an aircraft 600 that includes one or more components manufactured with the use of laser projection systems that are calibrated via the calibration wall illustrated in FIGS. 3A-3C. Such aircraft may include, for example, and without limitation, aircraft commercially-available from the Boeing Company of Chicago, Ill. As shown in FIG. 6, the aircraft 600 includes one or more propulsion units 604 coupled to a fuselage 602, wing assemblies 606 (or other lifting surfaces), a tail assembly 608, a landing assembly 610, a control system (not visible), and a host of other systems and subsystems that enable proper operation of the aircraft 600. For example, at least a portion of the wing assemblies 606 may include one or more components that are manufactured with the use of the laser projection systems that are calibrated via the calibration wall.

Embodiments of systems and methods in accordance with the present disclosure may provide significant advantages over the prior art. The calibration wall enables the quantitative analysis of the laser projection accuracy of a laser projection system. Specifically, the calibration wall provides a mechanism to determine the positioning accuracy of a laser projection system using non-aligned points when the system is aligned using a minimum number of key points. Additionally, the portability of the calibration provides flexibility and adaptability in testing laser projection systems at various locations. Accordingly, the laser projection system calibration wall may advantageously enable on-site testing that increases productivity and efficiency by reducing downtime associated with calibration. Costs associated with the transport of laser projection systems for calibration and testing may also be reduced or eliminated.

While embodiments of the disclosure have been illustrated and described above, many changes can be made without departing from the spirit and scope of the disclosure. Accordingly, the scopes of the embodiments are not limited by the disclosure. Instead, the embodiments of the disclosure should be determined entirely by reference to the claims that follow.

What is claimed is:

1. An apparatus for calibrating a laser projection system, comprising:
   a structural frame;
   a plurality of non-movable reflective targets disposed on the structural frame having a plurality of corresponding reflective surfaces lying in a plane, each reflective surface to reflect a corresponding laser beam;
   at least one positioning stage coupled to the structural frame; and
   a corresponding movable reflective target disposed on each positioning stage to reflect a corresponding laser beam, wherein each positioning stage at least moves the corresponding movable reflective target laterally in the plane.

2. The apparatus of claim 1, wherein the structural frame is a cross-member framework.

3. The apparatus of claim 1, wherein each positioning stage further moves the corresponding movable reflective target transversely with respect to the plane.

4. The apparatus of claim 1, further comprising at least one wheel attached to the structural frame.

5. The apparatus of claim 1 further comprising at least one adjustable jack stand attached to the structural frame, wherein the at least one jack stand is to position that structural frame so that at least two non-movable reflective targets are approximately aligned on a level horizontal axis.

6. The apparatus of claim 1, wherein each positioning stage is a multiple-axes positioning stage.

7. The apparatus of claim 1, wherein each one positioning stage is one of a two-axes positioning stage or a three-axes positing stage.

8. The apparatus of claim 7, wherein the two-axes positioning stage includes a first portion that moves laterally along a first axis, and a second portion that moves laterally along a second axis that is perpendicular to the first axis.

9. The apparatus of claim 7, wherein the three-axes positioning stage includes a first portion that moves laterally along a first axis, a second portion that moves laterally along a second axis that is perpendicular to the first axis, and a third portion that moves laterally along a third axis that is perpendicular to the first axis and the second axis.

10. The apparatus of claim 7, wherein each of the stage portions include a micrometer to measure a lateral movement of a corresponding stage portion from a starting point.

11. The apparatus of claim 7, further comprising a corresponding powered actuator attached to each of the stage portions, each of the powered actuators to laterally move a corresponding stage portion.

12. A method, comprising:
projecting a plurality of laser beams from a laser projection system to a corresponding number of reflective targets, wherein positions of the reflective targets form a position pattern that defines a corresponding in-tolerance orientation for each laser beam;
centering each of one or more first laser beams of the plurality of laser beams onto a corresponding non-movable reflective target included in the plurality of reflective targets;
moving one or more movable reflective targets included in the plurality of reflective targets so that each of one or more second laser beams of the plurality of laser beams is centered on a corresponding movable reflective target;
obtaining one or more measurements that indicate a deviation of each of the one or more movable reflective targets from a corresponding original position; and
comparing each at deviation to a corresponding orientation tolerance to determine a usability of the laser projection system.

13. The method of claim 12, wherein the reflective targets are aligned along one or more axes.

14. The method of claim 12, further comprising determining that that the laser projection system is usable when each if deviation is within the corresponding tolerance, and determining that the laser projection system is unusable if at least one deviation is outside one or more corresponding tolerances.

15. The method of claim 12, wherein at least two of the reflective targets are disposed on a horizontal member of a structural frame, further comprising adjusting the structural frame so that the at least two reflective targets are substantially horizontally level.

16. The method of claim 12, wherein moving the one or more movable reflective target includes moving each reflective target laterally along a first axis and laterally along a second axis that is perpendicular to the first axis.

17. The method of claim 12, wherein moving the one or more movable reflective target further includes moving each reflective target laterally along a third axis that is perpendicular to the first axis and perpendicular to the second axis.

18. The method of claim 12, further comprising adjusting an orientation of a laser beam to bring the orientation within-tolerance.

19. A method, comprising:
coupling a positioning stage having multiple stage portions to a structural frame;
disposing a first reflective target on the positioning stage;
placing a plurality of second reflective targets on the structural frame, the plurality of second reflective targets having reflective surfaces that lie in a plane; and
moving a stage portion of the positioning stage to move the first reflective target laterally in the plane or transversely with respect to the plane.

20. The method of claim 19, wherein the at least one positioning stage includes a multiple-axes positioning stage.

21. The method of claim 19, further comprising attaching at least of one or more wheels or one or more jack stands to the structural member.

* * * * *